United States Patent

[11] 3,534,729

| [72] | Inventor | Satoru Sakamoto |
| | | Tokyo, Japan |
| [21] | Appl. No. | 740,736 |
| [22] | Filed | June 27, 1968 |
| [45] | Patented | Oct. 20, 1970 |
| [73] | Assignee | Olympus Optical Company, Ltd. |
| | | Tokyo, Japan |
| [32] | Priority | July 7, 1967 |
| [33] | | Japan |
| [31] | | 42/43,319 |

[54] ELONGATED STEREOOPTICAL SYSTEM
6 Claims, 5 Drawing Figs.

[52] U.S. Cl. .................................... 128/6,
350/96, 350/130, 350/175, 356/241
[51] Int. Cl. .................................... A61b 1/04,
A61b 1/06
[50] Field of Search ......................... 128/4,
5, 6, 7, 8, 9, 10, 11, 275.1, 3; 350/130, 135, 96, 175 (Inquired);
95/11(H.C.); 356/241

[56] References Cited
UNITED STATES PATENTS

| 2,927,574 | 3/1960 | Scholz | 128/6 |
| 2,968,228 | 1/1961 | Merritt | 350/175 |
| 3,414,344 | 12/1968 | Mukojima | 350/35 |

*Primary Examiner*— Richard A. Gaudet
*Assistant Examiner*— Gerard F. Dunne
*Attorney*— Kurt Kelman

ABSTRACT: An elongated stereooptical system housed in a small forward end portion of an elongated tube of an instrument such as an endoscope. The elongated steroptical system has two objective lens system juxtaposed so as to be directed to an object located sidewards of the longitudinal axis of the small forward end portion of the elongated tube and a finder optical system including light reflecting means and an objective lens system for receiving the light from the object and reflecting it toward the forward end of an image transmitting optical system extending through the elongated tube. A spherical lens element is incorporated in at least one of the two objective lens systems for taking the stereoscopic pictures. The spherical lens element is commonly used as a lens element in the objective lens system of the finder optical system so that the optical axis thereof extending from the light reflecting means toward the object is positioned in a direction substantially parallel to those of the objective lens systems for taking the stereoscopic pictures while the space required for arranging the two objective lens systems for taking the stereoscopic pictures and the objective lens system of the finder optical system is made to the minimum.

One of the two objective lens systems which is not combined with the finder optical system can be omitted when the stereooptical system is not required.

INVENTOR.
SATORU SAKAMOTO
BY Kurt Kelman
AGENT

ELONGATED STEREOOPTICAL SYSTEM

BACKGROUND OF THE INVENTION

The present invention relates to an elongated optical system, and particularly to an elongated stereooptical system to be used in an instrument such as an endoscope having an elongated tube to be inserted into a hollow portion of a living body such as a human body.

It is well known in the field of the optical technique to provide two juxtaposed objective lens systems in order to stereoscopically view or take stereoscopic pictures of an object so that the height or depth of the unevenness in the surface of the object is accurately detected.

Therefore, an instrument such as an endoscope having an elongated tube to be inserted into a hollow portion of a living body such as a human body for the stereoscopic inspection or the stereoscopic photographing thereof must be provided with an elongated stereooptical system in the small forward end portion of the elongated tube which comprises two juxtaposed objective lens systems with the optical axes thereof positioned at an angle such as a right angle with respect to the longitudinal axis of the small forward end portion of the elongated tube.

The two juxtaposed objective lens systems for taking the stereoscopic pictures are preferably located along the longitudinal axis of the small forward end portion of the elongated tube so as to make the diameter thereof as small as possible.

In order to properly position the small forward end portion housing therein the stereooptical system which is inserted into the hollow portion of the living body so that the object to be inspected is properly sighted by the two juxtaposed objective lens systems, a finder optical system must also be incorporated in the small forward end portion of the elongated tube of the instrument to thereby catch the object so that the small forward end portion of the elongated tube is positioned so as to properly direct the two objective lens systems for taking the stereoscopic pictures toward the object.

When the finder optical system is provided in the small forward end portion of the elongated tube, light reflecting means such as a mirror is located adjacent to the two objective lens system for taking the stereoscopic pictures. The light reflecting means is so arranged that it receives the light from the object and reflects it toward an objective lens system located in front of and in alignment with the forward end of an image transmitting optical system such as a fiber optical system extending through the elongated tube. The objective lens system of the finder optical system focuses an image of the object on the forward end of the image transmitting optical system by the light from the object. The image thus formed on the forward end of the image transmitting optical system is transmitted therethrough to the rearward end of the image transmitting optical system. The image of the object thus transmitted to the rearward end of the image transmitting optical system is viewed through ocular means located behind the rearward end of the image transmitting optical system in alignment therewith so that the positioning of the small forward end portion of the elongated tube is regulated.

Since the diameter of the small forward end portion of the elongated tube must be very small because it must be inserted into a narrow hollow portion of the living body, it is difficult to arrange the two objective lens systems for taking the stereoscopic pictures together with the finder optical system in the small forward end portion the diameter of which is greatly limited.

When the light reflecting means is located remote from the two objective lens systems for taking the stereoscopic pictures in order to avoid the above difficulty, a substantial parallax angle is formed between the optical axes of the two objective lens systems for taking the stereoscopic pictures and the optical axis of the finder optical system extending from the light reflecting means toward the object thereby making it impossible to have the image of the object formed by the finder optical system properly coincide with those to be obtained by the two objective lens systems for taking the stereoscopic pictures if the object is not located at the position at which the optical axis of the finder optical system extending toward the object intersects the axis located between the optical axes of the two objective lens systems for taking the stereoscopic pictures substantially parallel thereto and equally spaced therefrom in symmetrical relationship. This results in stereoscopic pictures of an object which is not sighted by the finder optical system and, therefore, is not desired to be photographed.

In order to avoid the above disadvantage caused by the above described parallax angle, the light reflecting means of the finder optical system may be located intermediate the two objective lens systems for taking the stereoscopic pictures forwardly thereof. In this case, the parallax angle formed between the optical axes of the two objective lens systems and the optical axis of the finder optical system can be made to zero. However, the space required for such an arrangement of the two objective lens systems and the finder optical system in the small forward end portion of the elongated tube becomes considerably great, because the lens barrel for holding each of the two objective lens systems has a certain length along the optical axis thereof and the arrangement of the light reflecting means as stated above necessarily results in enlargement of the diameter of the small forward end portion of the elongated tube, thereby resulting in a substantial disadvantage of the stereooptical system to be used in the small forward end portion of the elongated tube of an endoscope.

The present invention avoids the above stated disadvantages in the elongated stereooptical system to be used in a small forward end portion of an elongated tube of an instrument such as an endoscope adapted to take stereoscopic pictures of an object in a hollow portion of a living body such as a human body and provides a novel and useful elongated stereooptical system for use in an instrument of the type described above.

It is apparent that one of the objective lens systems may be omitted if the stereooptical system is not required and only a single objective lens system is sufficient for inspecting the object.

SUMMARY OF THE INVENTION

The present invention provides a novel and useful elongated stereooptical system adapted to be housed in a small forward end portion of an elongated tube of an instrument such as an endoscope for inspecting or photographing an object in a hollow portion of a living body such as a human body.

The stereooptical system of the present invention comprises two juxtaposed objective lens systems with the optical axes thereof directed sidewards of the longitudinal axis of a small forward end portion of an elongated tube of an instrument such as an endoscope housing the two objective lens systems therein and adapted to take stereoscopic pictures of an object located sidewards of the longitudinal axis of the small forward end portion of the elongated tube. The small forward end portion is adapted to be inserted into a hollow portion of a living body for the inspection thereof. The two objective lens systems are preferably arranged along the longitudinal axis of the small forward end portion of the elongated tube so as to make the diameter thereof as small as possible. The stereooptical system of the present invention further comprises a finder optical system located in the small forward end portion adjacent to the two objective lens systems and having a light reflecting means such as a mirror and an objective lens system. The light reflecting means receives the light from the object and reflect it toward the objective lens system of the finder optical system. The objective lens system of the finder optical system is located in front of and in alignment with the forward end of an image transmitting optical system such as a fiber optical system extending through the elongated tube of the instrument, so that an image of the object is formed on the forward end of the image transmitting optical system by the light from the object received and reflected by the light reflecting means and passing through the objective lens system of the finder optical system. The image formed on the forward end of the image transmitting optical system is transmitted therethrough to the rearward end of the image transmitting optical system. The image thus transmitted to the rearward end of the image transmitting optical system is viewed through ocular means located behind the rearward end of the image transmitting optical system in alignment therewith so that the small forward end portion of the elongated tube can be positioned so as to permit the two objective lens systems for taking the stereoscopic pictures to properly aim at the object to be inspected.

The characteristic feature of the present invention lies in the fact that at least one of the two objective lens systems for taking the stereoscopic pictures includes a spherical lens element and this spherical lens element is used simultaneously as a lens element in the objective lens system of the finder optical system so that the optical axis of the finder optical system extending toward the object is positioned close to those of the objective lens systems for taking the stereoscopic pictures substantially parallel thereto thereby permitting the parallax angle between the optical axes of the two objective lens systems for taking the stereoscopic pictures and the optical axis of the finder optical system extending toward the object to be made to zero while the space required to arrange all the above stated optical systems is made to the minimum.

In case the two objective lens systems for taking the stereoscopic pictures are arranged along the longitudinal axis of the small forward end portion of the elongated tube, the spherical lens element incorporated in the objective lens system located remote from the forward end of the small forward end portion of the elongated tube is used commonly as the lens element in the finder optical system and the light reflecting means is located intermediate the two objective lens systems thereby permitting the optical axis of the finder optical system extending toward the object to be exactly coincided with the axis positioned between and substantially parallel to the optical axes of the two objective lens systems for taking the stereoscopic pictures and equally spaced therefrom.

Further, the light received by the spherical lens element at an angle of incidence goes out of the spherical lens element at the same angle of exit as the angle of incidence by virtue of the theory of the optics. Therefore, the arrangement of the optical elements of the present invention as described above can positively prevent the light received by either of the objective lens system for taking pictures or the finder optical system from being merged into the light of the other optical system so that the blurring of the image formed by either of the objective lens system for taking pictures or the finder optical system is positively avoided.

The above described constructions are extremely advantageous for use in an instrument such as an endoscope having an elongated tube to be inserted in a narrow hollow portion of a living body such as a human body for the inspection thereof.

In order to improve the optical characteristics of the objective lens system having the spherical lens element, lens elements or groups may be incorporated in the objective lens system for compensating for the aberration generated by the spherical lens element.

As previously described, if the stereooptical system is not required and only a single objective lens system suffices for taking a picture of the object, one of the two objective lens systems for taking pictures which is not combined with the finder optical system can be omitted.

Therefore, the object of the present invention is to provide a novel and useful optical system for use in an instrument such as an endoscope having the above stated features separately or in combination.

The advantages obtained by the present invention is summarized as follows:

1. The center of the image formed by the finder optical system can always coincide with the center of the domain common to both the images obtained by the two objective lens systems for taking the stereoscopic pictures, respectively, because the parallax angle is made to zero.
2. The space required for arranging the entire optical systems can be made to the minimum, because a part of the optical system for taking pictures is commonly used as a part of the finder optical system.
3. Since the spherical lens element is used, it is easy to set the position of each of the optical elements without deteriorating the optical characteristics of the optical system, because no particular optical axis exists which requires the optical elements in the optical system to be accurately aligned with such an optical system. It is merely necessary that the optical axis of the optical elements to be combined with the spherical lens element is passed through the center of the spherical lens element.
4. The arrangement of the optical elements of the present invention as described above can also prevent the light received by either of the objective lens system for taking pictures or the finder optical system from being merged into the light of the other optical system so that the blurring of the image formed by either of the objective lens system for taking pictures or the finder optical system is positively avoided.

DETAILED DESCRIPTION OF THE PREFERRED EMBODIMENT

Prior to the description of the embodiment of the present invention, brief description will be made to show the principle of the stereooptical system with reference to some types of the arrangements therefor.

Figure 1:
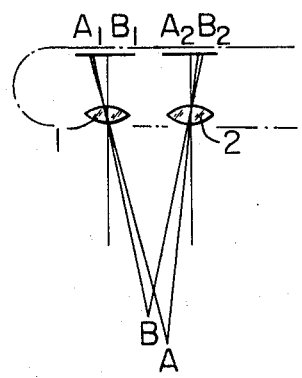
FIG. 1 is a schematic view showing the principle of the stereooptical system.

FIG. 1 shows the principle of the stereooptical system for an endoscope. Two objective lenses 1, 2 are arranged in the forward end portion of an elongated tube indicated by chain dot line in juxtaposed relationship with the optical axes thereof being directed transverse to the longitudinal axis of the elongated tube. The forward end portion is adapted to be inserted into the hollow portion of a living body. The light from portions A, B of an object is received by the two objective lenses 1, 2 and forms images $A_1 B_1$, $A_2 B_2$ on a film located in the forward end portion of the elongated tube opposite to the objective lenses 1, 2 respectively.

Since a parallax angle is formed between the two light rays issuing from the object and received by the respective objective lenses 1, 2. The images $A_1 B_1$, $A_2 B_2$ form a pair of stereoscopic pictures, so that the difference between the distance from point A to the film and that from point B to the film can be accurately detected.

Figure 2:
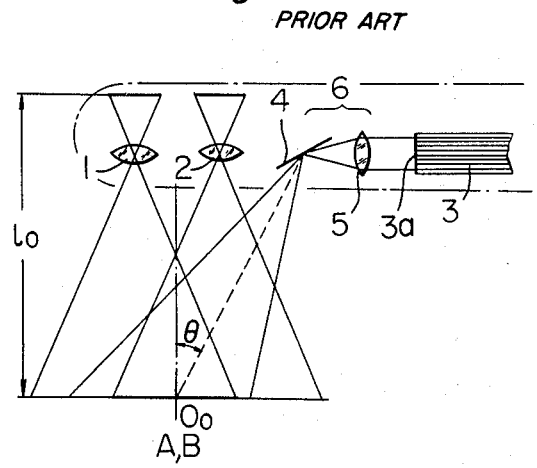
FIG. 2 is a schematic view showing one type of the stereooptical system in which a finder optical system is incorporated.

FIG. 2 shows a stereooptical system in which a finder optical system 6 is incorporated. The finder optical system 6 comprises a mirror 4 and an objective lens 5. The mirror 4 is located adjacent to the two objective lenses 1, 2 but spaced from the forward end of the two objective lenses 1, 2 a distance greater than those by which the two objective lenses 1, 2 are spaced. The mirror 4 is positioned in inclined relationship to the longitudinal axis of the elongated tube so that the light from the object A, B is received by the mirror 4 and is reflected toward the objective lens 5. An image transmitting optical system 3 such as a fiber optical system extends through the elongated tube and the forward end 3a thereof is located behind the objective lens 5 in alignment therewith. Therefore, an image of the object A, B can be focused on the forward end 3a. The image thus formed on the forward end 3a is transmitted through the image transmitting optical system 3 to the rearward end thereof so that the image in the rearward end can be viewed through ocular means not shown located behind the rearward end of the image transmitting optical system 3 in alignment therewith. By controlling the positioning of the forward end portion of the elongated tube in accordance with the image viewed through the ocular means, the object desired to be steroscopically photographed may be properly aimed by the two objective lenses 1, 2.

As shown in FIG. 2, however, since a parallax angle $\theta$ is formed between the center line passing through the midpoint between the two objective lenses 1, 2 and extending substantially in parallel to the optical axes of the two objective lenses 1, 2 equally spaced therefrom and the optical path of the finder optical system 6 extending from the mirror 4 to the point $O_o$, the object A, B desired to be photographed cannot be caught by the finder optical system 6, if the object is not located at the distance $l_o$ from the film, that is, if the object is located at a position along the above described center line but spaced far from the point therein at which the optical path of the finder optical system 6 extending toward the object intersects the above described center line because of the parallax angle $\Theta$ formed therebetween. In other words, the object desired to be photographed might not be aimed properly even though the object is caught by the finder optical system 6 if the object is located remote from the above described intersecting point.

Figure 3:
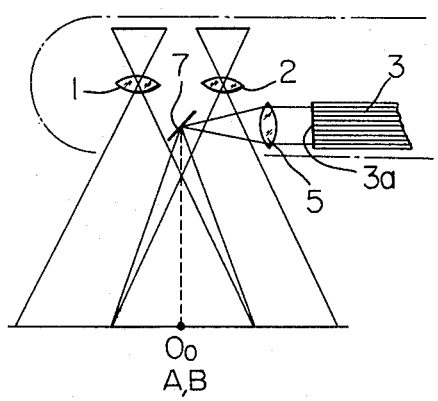
FIG. 3 is a view similar to FIG. 2 but showing another type of the stereooptical system in which a finder optical system is incorporated with the optical axis thereof being aligned with the center line between the optical axes of the two objective lens systems for taking stereoscopic pictures running substantially parallel thereto.

In order to avoid the above disadvantage, the mirror 7 of the finder optical system similar in function to the mirror 4 may be located in the center line passing through the midpoint between the two objective lenses 1, 2 and extending in parallel to the optical axes of the two objective lenses 1, 2 equally spaced therefrom as shown in FIG. 3, so that the parallax angle $\Theta$ formed between the light incident to the objective lenses 1, 2 and that received by the mirror 7 is made to zero. In this case, however, the diameter of the forward end portion of the elongated tube must necessarily be enlarged, because the lens barrel holding each of the objective lenses 1, 2 has a substantial length and the mirror 7 must be located at a position slightly forward of the objective lenses 1, 2. Such an enlargement of the forward end portion of the elongated tube is a serious disadvantage for use in an endoscope.

In accordance with the present invention, the above described disadvantages are avoided by providing a spherical lens element in at least one of the two objective lens systems for taking stereoscopic pictures, which is simultaneously utilized as a lens element of the objective lens system in the finder optical system thereby permitting the above described parallax angle $\Theta$ to be made to zero while the space required for arranging the two objective lens systems and the finder optical system is kept at the minimum.

Figure 4:
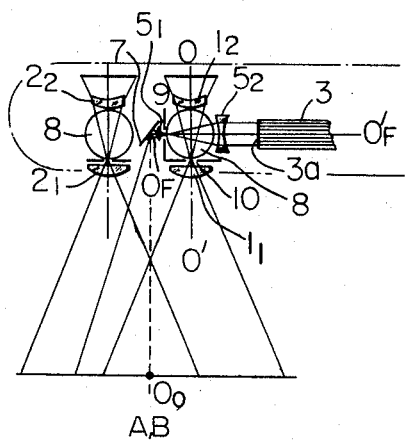
FIG. 4 is a view showing the stereooptical system in accordance with the present invention.

Referring to FIG. 4 illustrating the preferred embodiment of the present invention, each of the two objective lens systems comprises a forward lens element $1_1(2_1)$, a rearward lens element $1_2(2_2)$ and a spherical lens element 8 interposed between the forward and rearward lens elements in coaxial relationship, a diaphragm stop 10 being located between the forward lens element and the spherical lens element. The arrangement of the two objective lens systems of FIG. 4 is similar to those in FIGS. 2 and 3, so that the stereoscopic images of the object are formed on the film located in the forward end portion of the elongated tube at the side opposite to the two objective lens systems.

According to the present invention, mirror 7 is located between the two objective lens systems for taking pictures in the optical axis of the finder optical system comprising a forward lens element $5_1$, the spherical lens element 8 common to one of the objective lens systems for taking pictures, and a rearward lens element $5_2$, a diaphragm stop 9 being interposed between the forward lens element $5_1$ and the spherical lens element 8. As shown in FIG. 4, the light received by the mirror 7 is reflected toward the objective lens system of the finder optical system and passes therethrough to focus an image on the forward end 3a of the image transmitting optical system such as a fiber optical system. No parallax angle is formed between the optical axis $O_F O_o$ of the finder optical system and the optical axes of the two objective lens systems O–O' while the optical axis $O_F-O'_F$ of the finder optical system intersects the optical axis O–O' of one of the two objective lens systems substantially transverse thereto. The forward and rearward lens elements in each of the objective lens systems serve to compensate for the aberration generated by the spherical lens element in cooperation with the diaphragm stop incorporated in the objective lens system.

Figure 5:
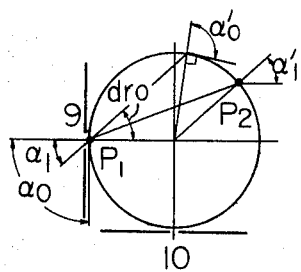
FIG. 5 is a diagram showing the optical path of the finder optical system of the present invention.

As previously described, the light incident to the spherical lens element at an angle of incidence goes out of the spherical lens element at the same angle of exit as the angle of incidence. FIG. 5 shows the schema of the above fact. In FIG. 5, if the light is incident at point $P_1$ to the spherical lens element at the angle of incidence $\alpha 1$, then the light passes along the line $P_1-P_2$ in the spherical lens element and goes out thereof at point $P_2$ at the angle of exit $\alpha_1'$ which is the same as the angle of incidence $\alpha_1$. Considering the critical condition in which the light is incident at point $P_1$ to the spherical lens element at the critical angle of incidence $\alpha_o$ that is a right angle, the light passes along the line starting from the point $P_1$ and directed at the critical refracting angle dro with respect to the normal to the surface of the spherical lens element passing through the point $P_1$ and goes out from the spherical lens element at the critical angle of exit $\alpha_o'$ which is equal to the angle $\alpha_o$, i.e. a right angle. The direction of the light leaving the spherical lens element in the above described critical condition depends upon the refractive index of the material forming the spherical lens element. Therefore, if the refractive index is selected to be $n = 1.5$, then the critical refracting angle dro is about 42°. This means that the light incident to the spherical lens element through the diaphragm stop 9 is not merged into the light passing through the diaphragm stop 10 and vice versa, so that the blurring of the image in either of the film or in the finder optical system is positively prevented.

As previously described, if the stereooptical system is not required and only a single objective lens system is sufficient for taking the picture of the object, one of the two objective lens systems which is not combined with the finder optical system may be omitted while the space required for arranging the various optical elements is kept at the minimum.

I claim:

1. An elongated stereooptical system arranged in a small forward end portion of an elongated tube and comprising two juxtaposed objective lens systems for taking stereoscopic pictures of an object located sidewards of the longitudinal axis of said small forward end portion and a finder optical system including a light reflecting means and an objective lens system adapted to receive the light from the object and reflect it toward the forward end of an image transmitting optical system extending through said elongated tube so as to form an image of the object thereon, wherein the improvement comprises a spherical lens element incorporated in at least one of said two objective lens systems for taking the stereoscopic pictures of the object, said spherical lens element being commonly used as a lens element in said objective lens system of said finder optical system which is located between said light reflecting means and said forward end of said image transmitting optical system thereby permitting the optical axis of said finder optical system extending from said light reflecting means toward the object to be positioned in a direction substantially parallel to those of said two objective lens systems for taking the stereoscopic pictures so that the parallax between the optical axes of said two objective lens systems for taking the stereoscopic pictures and the optical axis of said finder optical system is positively avoided, while the space required for arranging said two objective lens systems for taking the stereoscopic pictures and said objective lens system of said finder optical system is made to the minimum.

2. An elongated stereooptical system according to claim 1, wherein said two juxtaposed objective lens systems are arranged along the longitudinal axis of said small forward end portion, and the spherical lens element in one of the two objective lens systems for taking the stereoscopic pictures located remote from the forward end of said small forward end portion is used commonly as the lens element in said objective lens system of said finder optical system, said light reflecting means being located between said two objective lens systems for taking the stereoscopic pictures so that the optical axis of said finder optical system extending toward the object is located between the two optical axes of said two objective lens systems for taking the stereoscopic pictures substantially parallel thereto.

3. An elongated stereooptical system according to claim 1, wherein both of said two objective lens systems for taking the stereoscopic pictures are provided with the spherical lens elements, respectively.

4. An elongated stereooptical system according to claim 1, wherein the optical axis of said finder optical system extending from said light reflecting means toward the object is perpendicular to the optical axis extending from said light reflecting means toward said forward end of said image transmitting optical system.

5. An elongated stereooptical system according to claim 1, wherein each of said two objective lens systems for taking the stereoscopic pictures is provided with lens elements and a diaphragm stop for compensating for the aberration generated by said spherical lens element while lens elements and a diaphragm stop are provided in said finder optical system between said light reflecting means and said forward end of said image transmitting optical system for compensating for the aberration generated by said spherical lens element.

6. An elongated optical system having at least an objective lens system and a finder optical system located in the small forward end portion of an elongated tube of an endoscope for photographing an object in a hollow portion of a living body and the like by inserting said small forward end portion in said hollow portion of the living body, said objective lens system being directed sidewards with respect to the longitudinal axis of said small forward end portion of the elongated tube so as to photograph an object located sidewards of the longitudinal axis of said small forward end portion, said finder optical system having an objective lens and a light reflecting means and being adapted to focus an image of the object on the forward end of an image transmitting optical system extending through said elongated tube by the light from the object and reflected toward said image transmitting optical system, the image formed on the forward end of said image transmitting optical system being transmitted to the rearward end thereof so that it is viewed through ocular means located behind the rearward end of said image transmitting optical system thereby permitting said small forward end portion to be positioned properly for photographing the object by said objective lens system, wherein the improvement comprises a spherical lens element incorporated in said objective lens system for taking pictures, said spherical lens element being simultaneously utilized as a lens element in said objective lens in said finder optical system with said light reflecting means being located close to said objective lens system for taking pictures, thereby permitting the parallax angle formed between the optical axis of said objective lens system for taking pictures and the optical axis of said finder optical system extending to the object to be made to zero while the space required for arranging the above described optical elements in said small forward end portion is made to the minimum.